United States Patent
Ren

(10) Patent No.: US 7,783,904 B2
(45) Date of Patent: Aug. 24, 2010

(54) CIRCUIT FOR PROTECTING COMPUTER SYSTEM

(75) Inventor: Ze-Shu Ren, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 655 days.

(21) Appl. No.: 11/767,481

(22) Filed: Jun. 23, 2007

(65) Prior Publication Data

US 2008/0155292 A1    Jun. 26, 2008

(30) Foreign Application Priority Data

Dec. 22, 2006   (CN) ................. 2006 2 0016696 U

(51) Int. Cl.
*G06F 13/00*    (2006.01)
(52) U.S. Cl. ............... 713/310; 710/300; 710/301; 710/302
(58) Field of Classification Search .......... 713/310; 710/300–302
See application file for complete search history.

(56) References Cited

U.S. PATENT DOCUMENTS

| 6,066,900 | A  | * | 5/2000  | Chan et al. ............. 307/38 |
| 6,434,653 | B1 | * | 8/2002  | Winston ............. 710/303 |
| 6,603,217 | B2 | * | 8/2003  | Ooishi et al. ............. 307/29 |
| 6,735,696 | B1 | * | 5/2004  | Hannah ............. 713/189 |
| 7,143,203 | B1 | * | 11/2006 | Altmejd ............. 710/16 |

* cited by examiner

*Primary Examiner*—Abdelmoniem Elamin
(74) *Attorney, Agent, or Firm*—Frank R. Niranjan

(57) ABSTRACT

A circuit for preventing a computer from being powered on before a CPU of the computer has been properly installed, the circuit includes a power supply (70) for the computer, a controller (60) connected to the power supply configured for controlling the power supply, a switch (10) exposed outside the computer for convenient operation, and a switching device (Q1). The controller includes a terminal for receiving a computer startup signal. The switch is connected to the terminal of the controller for sending the computer startup signal to the controller when the switch is triggered, wherein when the computer startup signal is sent to the sensing terminal of the controller, the controller controls the power supply to provide power to the computer. The switching device includes a control terminal configured for sensing if the CPU is installed to control conduction of the switching device.

13 Claims, 2 Drawing Sheets

CIRCUIT FOR PROTECTING COMPUTER SYSTEM

BACKGROUND OF THE INVENTION

1. Field of the Invention

The present invention relates to circuits for protecting computer systems, and more particularly to a circuit for preventing a computer from being powered on before a CPU of the computer has been properly installed.

2. Description of Related Art

It is necessary to test performance of a motherboard when the motherboard is manufactured. An operator needs to mount a CPU, a memory bank, and other computer devices to the motherboard during testing. Some of the voltage applied to the motherboard should be fed to the components or chips on the motherboard by the CPU. If the operator forgets to mount a CPU to the motherboard when a power supply to the motherboard is turned on, chips or components on the motherboard may be damaged due to high voltage.

What is needed, therefore, is a circuit for protecting a motherboard when there is no CPU on the motherboard.

SUMMARY OF THE INVENTION

A circuit for preventing a computer from being powered on before a CPU of the computer has been properly installed is provided. The circuit comprises a power supply for providing power to the computer, a controller connected to the power supply configured for controlling the power supply, a switch exposed outside the computer for convenient operation, the switch connected to the sensing terminal of the controller via a conducting path for sending the computer startup signal to the controller when the switch is triggered, wherein when the computer startup signal is sent to the sensing terminal of the controller, the controller controls the power supply to provide power to the computer, and a switching device serially connected in the path.

Other advantages and novel features will be drawn from the following detailed description of preferred embodiments with attached drawings, in which:

DETAILED DESCRIPTION OF THE INVENTION

Figure 1:
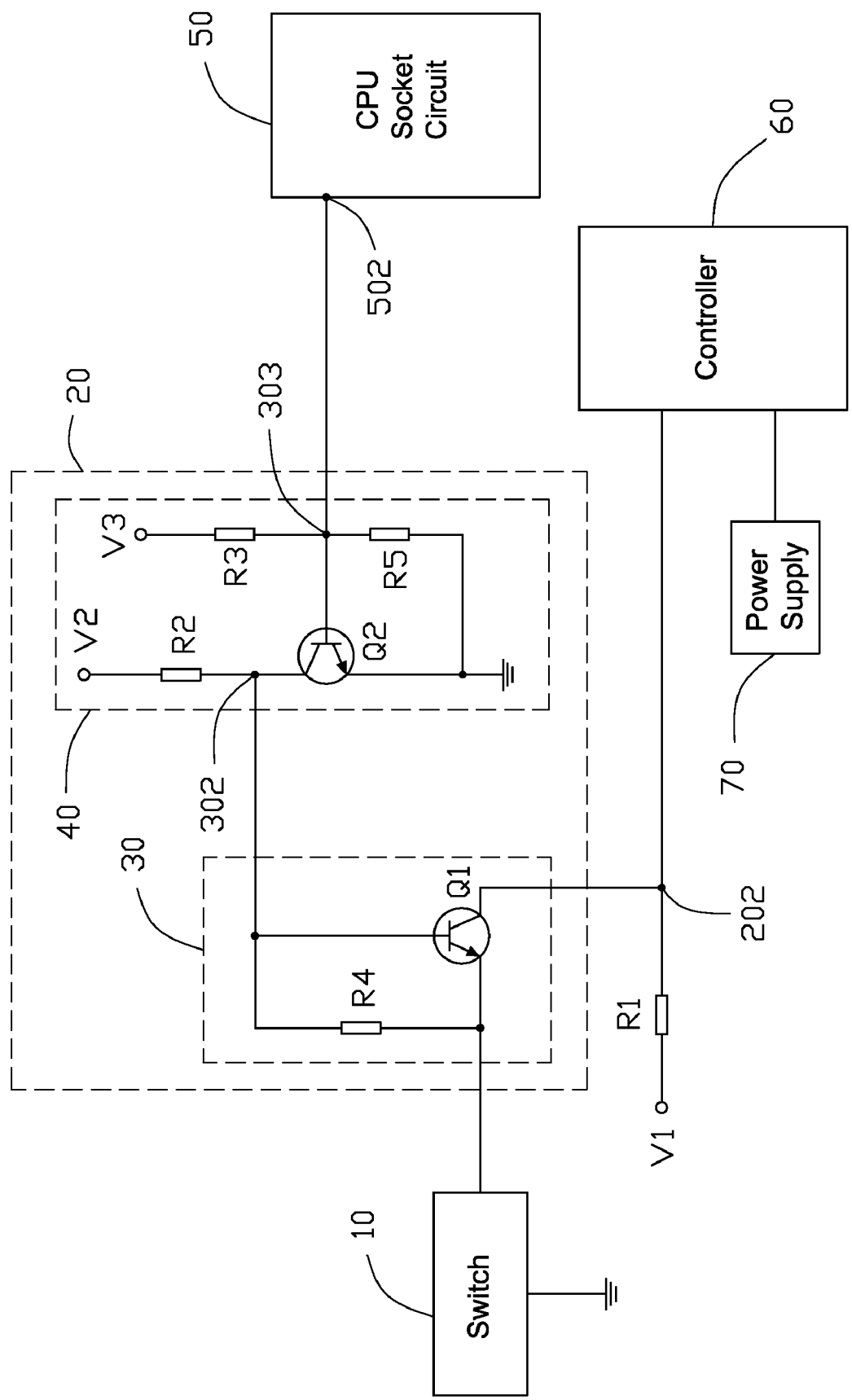
FIG. 1 is a diagram of a circuit for preventing a computer from being powered on before a CPU of the computer is not prepared properly in accordance with a preferred embodiment of the present invention.

Referring to FIG. 1, a circuit for preventing a computer from being powered on before a CPU of the computer has been properly installed in accordance with an embodiment of the present invention includes a switch 10, a controlling circuit 20, a CPU socket circuit 50, a controller 60, and a power supply 70.

The switch 10 includes two terminals. The switch 10 is exposed outside the computer for convenient operation. The controller 60 includes a sensing terminal configured for receiving a low level computer startup signal sent by the switch 10. The controlling circuit 20 includes a first switching circuit 30 and a second switching circuit 40. The first switching circuit 30 includes a first transistor Q1 and a resistor R4. The first transistor Q1 includes a collector connected to a first node 202, an emitter connected to one terminal of the switch 10, and a base connected to the emitter via the resistor R4. The other terminal of the switch 10 is connected to ground. The first node 202 is connected to a first voltage source V1 via a first resistor R1 and to the sensing terminal of the controller 60. The first node 202 is at high level when the first transistor Q1 is not turned on. The controller 60 is connected to the power supply 70.

The second switching circuit 40 includes a second transistor Q2, a second resistor R2, a third resistor R3, a resistor R5, a second voltage source V2, and a third voltage source V3. In this embodiment, the first and second transistors Q1, Q2 are NPN transistors. The second transistor Q2 includes a collector connected to a second node 302, a base connected to a third node 303, and an emitter connected to ground. The second node 302 is connected to the second voltage source V2 via the second resistor R2 and to the base of the first transistor Q1. The third node 303 is connected to the third voltage source V3 via the third resistor R3 and to ground via the resistor R5, and further to a terminal 502 of the CPU socket circuit 50. The terminal 502 of the CPU socket circuit 50 is used to connect a pin of a CPU to ground.

When the CPU is not mounted to the CPU socket circuit 50, the third node 303 is at high level and the second transistor Q2 is turned on. Thereby, the second node 302 is at low level because the voltage between the collector and the emitter of the second transistor Q2 is at low level. The base of the first transistor Q1 connected to the second node 302 is at low level to turn off the first transistor Q1. Thus, the first node 202 is at high level whether the switch 10 is triggered or not and the sensing terminal of the controller 60 receives no computer startup signal to control the power supply 70 to supply power to the computer.

When the CPU is mounted to the CPU socket circuit 50, the third node 303 is at low level and the second transistor Q2 is turned off. Thereby, the second node 302 is at high level. The base of the first transistor Q1 connected to the second node 302 is at high level to turn on the first transistor Q1. Thus, the first node 202 is at low level when the switch 10 is triggered and the sensing terminal of the controller 60 receives a computer startup signal to control the power supply 70 to supply power to the computer.

Figure 2:
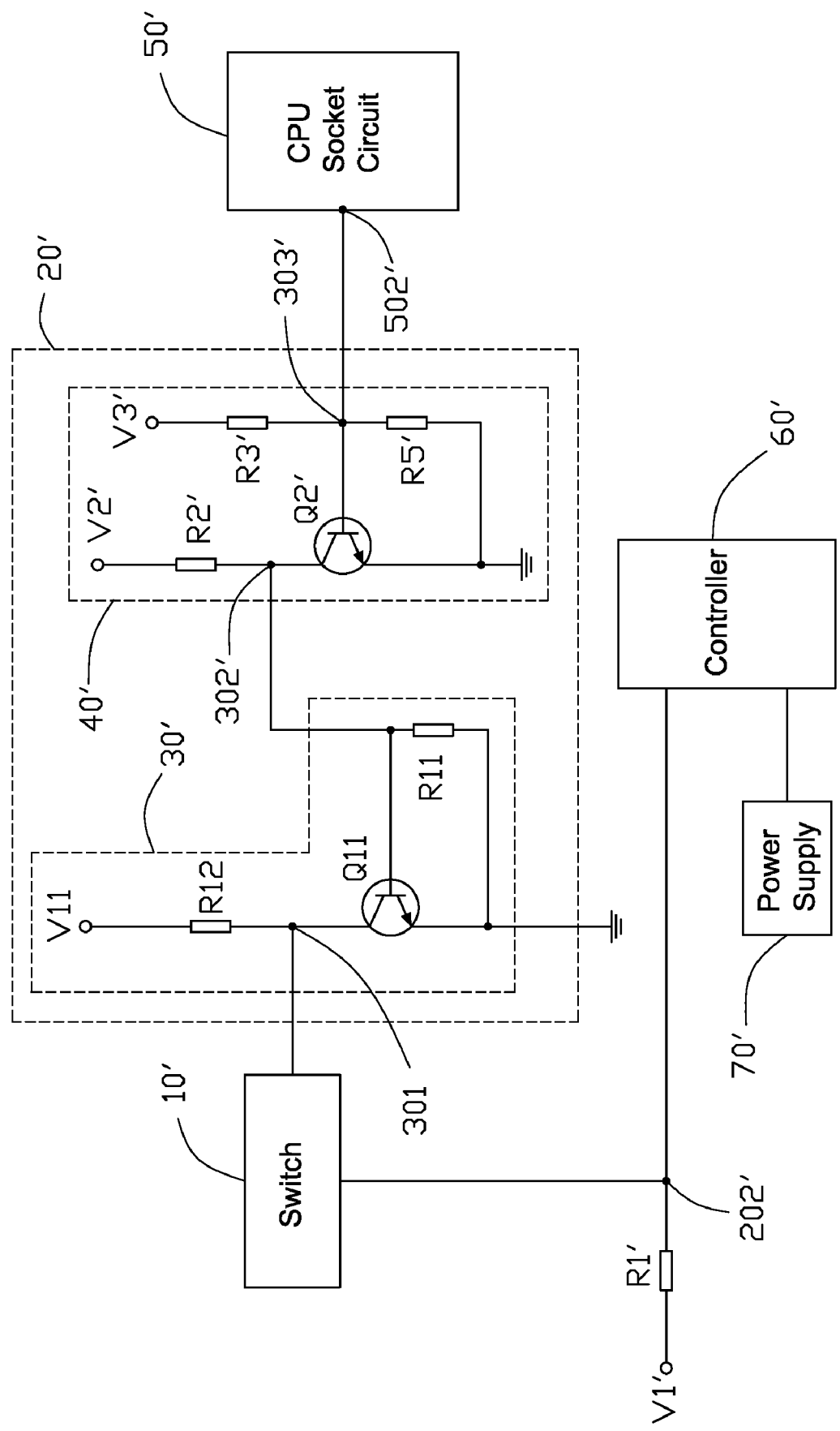
FIG. 2 is a diagram of a circuit for preventing a computer from being powered on before a CPU of the computer is not prepared properly in accordance with another preferred embodiment of the present invention.

Referring to FIG. 2, a circuit for protecting a motherboard in accordance with another embodiment includes a switch 10', a controlling circuit 20', a CPU socket circuit 50', a controller 60', and a power supply 70'.

The switch 10' includes two terminals. The switch 10' is exposed to outside of the computer for convenient operation. The controller 60' includes a sensing terminal configured for receiving a low level computer startup signal sent by the switch 10'. One terminal of the switch 10' is connected to a first node 202'. The first node 202' is connected to a first voltage source V1' via a first resistor R1' and to the sensing terminal of the controller 60'. The controller 60' is connected to the power supply 70'.

The controlling circuit 20' includes a first switching circuit 30' and a second switching circuit 40'. The first switching circuit 30' includes a first transistor Q11. The first transistor Q11 includes a collector connected to a node 301, an emitter connected to ground, and a base connected to the emitter via a resistor R11. The node 301 is connected to a voltage source V11 via a resistor R12 and to the other terminal of the switch 10'.

The second switching circuit 40' includes a second transistor Q2', a second resistor R2', a third resistor R3', a resistor R5', a second voltage source V2', and a third voltage source V3'. In this embodiment, the first and second transistors Q11, Q2' are NPN transistors. The second transistor Q2' includes a collector connected to a second node 302', a base connected to a third node 303', and an emitter connected to ground. The second node 302' is connected to the second voltage source V2' via the second resistor R2' and to the base of the first transistor Q11. The third node 303' is connected to the third voltage source V3' via the third resistor R3' and to the emitter of the second transistor Q2' via the resistor R5', and further to a terminal 502' of the CPU socket circuit 50'. The terminal 502' of the CPU socket circuit 50 is used to connect a pin of a CPU to ground.

When the CPU is not mounted in the CPU socket circuit 50', the third node 303' is at high level and the second transistor Q2' is turned on. Thereby, the second node 302' is at low level because the voltage between the collector and the emitter of the second transistor Q2' is at low level. The base of the first transistor Q11 connected to the second node 302' is at low level turning off the first transistor Q11. Thus, the node 301 is at high level. The first node 202' is at high level and the sensing terminal of the controller 60' receives no computer startup signal to control the power supply 70' to supply power to the computer whether the switch 10' is triggered or not.

When the CPU is mounted to the CPU socket circuit 50', the third node 303' is at low level and the second transistor Q2' is turned off. Thereby, the second node 302' is at high level. The base of the first transistor Q11 connected to the second node 302' is at high level turning on the first transistor Q11. Thus, the node 301 is at low level because the voltage between the collector and the emitter of the first transistor Q11 is at low level. The first node 202' is at low level and the sensing terminal of the controller 60' receives a computer startup signal to control the power supply 70' to supply power to the computer when the switch 10' is triggered.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A circuit for preventing a computer from being powered on before a CPU of the computer has been properly installed, the circuit comprising:
   a power supply for providing power to the computer;
   a controller connected to the power supply configured for controlling the power supply, the controller having a sensing terminal for receiving a computer startup signal;
   a switch exposed to outside of the computer for convenient operation, the switch connected to the sensing terminal of the controller via a conducting path for sending the computer startup signal to the controller when the switch is triggered, wherein when the computer startup signal is sent to the sensing terminal of the controller, the controller controls the supply to provide power to the computer; and
   a switching device serially connected in the path, the switching device comprising a control terminal configured for sensing whether the CPU has been installed to control conduction of the switching device, which controls conduction of the path;
   wherein the computer startup signal is a low level voltage signal and generated when the switch is triggered, and the sensing terminal of the controller is connected to a voltage source via a resistor; the sensing terminal of the controller is connected to ground via the path, the switch and the switching device are set in the path between the controller and ground; the sensing terminal of the controller is further connected to a voltage source via a resistor; and the control terminal of the switching device is connected to another switching device, the another switching device comprises a first terminal connected to a voltage source via a resistor and to the control terminal of the switching device, a second terminal connected to ground, and a control terminal configured for sensing if the CPU is installed to control conduction of the another switching device, which controls the conduction of the switching device.

2. The circuit as described in claim 1, wherein the switching device further comprises a first terminal and a second terminal, the first terminal is connected to the sensing terminal of the controller, the second terminal is connected to one terminal of the switch, the other terminal of the switch is connected to ground.

3. The circuit as described in claim 2, wherein the switching device comprises an NPN transistor, a collector of the NPN transistor acts as the first terminal of the switching device, an emitter of the NPN transistor acts as the second terminal of the switching device, a base of the NPN transistor acts as the control terminal of the switching device.

4. The circuit as described in claim 3, wherein the base of the NPN transistor is connected to the emitter of the NPN transistor via a resistor.

5. The circuit as described in claim 1, wherein the switching device further comprises a first terminal and a second terminal, the first terminal is connected to a voltage source via a resistor and to one terminal of the switch, the second terminal is connected to ground, the other terminal of the switch is connected to the sensing terminal of the controller.

6. The circuit as described in claim 5, wherein the switching device comprises an NPN transistor, a collector of the NPN transistor acts as the first terminal of the switching device, an emitter of the NPN transistor acts as the second terminal of the switching device, a base of the NPN transistor acts as the control terminal of the switching device.

7. The circuit as described in claim 6, wherein the base of the NPN transistor is connected to the emitter of the NPN transistor via a resistor.

8. The circuit as described in claim 1, wherein the control terminal of the another switching device is connected to a terminal of a CPU socket circuit which is used for connecting a pin of the CPU to ground, the control terminal of the another switching device is connected to a voltage source via a resistor.

9. The circuit as described in claim 1, wherein the another switching terminal is a NPN transistor, the first terminal of the another switching terminal is a collector of the NPN transistor, the second terminal of the another switching terminal is an emitter of the NPN transistor, the control terminal of the another switching terminal is a base of the NPN transistor.

10. The circuit as described in claim 9, wherein the base of the NPN transistor is connected to the emitter of the NPN transistor via a resistor.

11. A circuit for preventing a computer from being powered on before a CPU of the computer has been properly installed, the circuit comprising:
    a power supply for providing power to the computer;
    a controller connected to the power supply configured for controlling the power supply, the controller having a sensing terminal for receiving a computer startup signal;

a switch exposed to outside of the computer for operation, the switch connected between ground and the sensing terminal of the controller to form a conduction path for sending the computer startup signal to the controller when the switch is triggered, wherein when the computer startup signal is sent to the sensing terminal of the controller, the controller controls the supply to provide power to the computer; and a switching device serially connected in the conduction path, the switching device comprising a control terminal configured for detecting whether the CPU has been installed to thereby control conduction of the switching device such that if the CPU has been properly installed the switching device conducts the conduction path to allow the computer startup signal to be sent to the sensing terminal of the controller, and if the CPU has not been properly installed the switching device cuts off the conduction path to prevent the computer startup signal being sent to the sensing terminal of the controller;

wherein the computer startup signal is a low level voltage signal and generated when the switch is triggered, and the sensing terminal of the controller is connected to a voltage source via a resistor; and the circuit further comprising another switching device comprising a transistor, wherein the transistor comprises a first terminal configured to connect with a terminal of a CPU socket circuit which is used for connecting a pin of the CPU to ground, a second terminal connected to ground, and a third terminal connected to the control terminal of the switching device and a voltage source via a resistor.

12. The circuit as described in claim 11, wherein the switching device comprises a transistor which comprises a first terminal connected to the switch and another voltage source via another resistor, a second terminal connected to ground, and a third terminal acting as the control terminal.

13. The circuit as described in claim 11, wherein the switching device comprises a transistor which comprises a first terminal connected to the switch, a second terminal connected to the sensing terminal of the controller, and a third terminal acting as the control terminal.

* * * * *